United States Patent [19]

Lemberger

[11] 4,087,791
[45] May 2, 1978

[54] ELECTROMAGNETICALLY RESPONSIVE DEVICE AND SYSTEM FOR DETECTING THE SAME

[75] Inventor: Richard R. Lemberger, St. Paul, Minn.

[73] Assignee: Minnesota Mining and Manufacturing Company, St. Paul, Minn.

[21] Appl. No.: 504,059

[22] Filed: Sep. 9, 1974

[51] Int. Cl.² .............................................. G01S 9/02
[52] U.S. Cl. .................................... 340/152 T; 325/8; 340/258 C; 343/6.5 SS
[58] Field of Search ............... 340/152 T, 258 C, 280; 343/6.5 R, 6.5 SS, 6.8 R, 113 R, 113 PT; 325/8

[56] References Cited

U.S. PATENT DOCUMENTS

| | | |
|---|---|---|
| 2,511,409 | 6/1950 | Mayberry .................................. 325/8 |
| 2,896,204 | 7/1959 | Gille ..................................... 343/6.8 R |
| 3,035,262 | 5/1962 | Vantine, Jr. .............................. 343/6.5 |
| 3,229,684 | 1/1966 | Nagumo et al. ...................... 343/6.5 R |
| 3,713,133 | 1/1973 | Nathans ................................... 340/280 |
| 3,790,948 | 2/1974 | Ratkovich ............................ 343/113 R |
| 3,810,172 | 5/1974 | Burpee et al. ....................... 343/5 PD |
| 3,818,472 | 6/1974 | Mauk et al. ............................ 340/280 |

Primary Examiner—John W. Caldwell, Jr.
Assistant Examiner—Joseph E. Nowicki
Attorney, Agent, or Firm—Cruzan Alexander; Donald M. Sell; William B. Barte

[57] ABSTRACT

A passive electromagnetically responsive device comprising a miniature tuned inductive-capacitive circuit. The device is preferably detected by stimulating oscillations at the resonant frequency of the circuit by a pulsed electromagnetic field. The device is desirably used in projectiles to enable remote tagging and detection and/or identification of livestock.

4 Claims, 8 Drawing Figures

ELECTROMAGNETICALLY RESPONSIVE DEVICE AND SYSTEM FOR DETECTING THE SAME

BACKGROUND OF THE INVENTION

1. Field of the Invention

This invention relates to systems enabling the remote detection and identification of objects.

2. Description of the Prior Art

Numerous systems utilizing some form of electromagnetically responsive tag or marker affixable to an object to be detected and/or identified are known in the art. For example, passive tags, i.e., those not having an internal source of power and which are thus incapable of directly producing an electromagnetic field, are capable of responding to an external electromagnetic field in a manner enabling remote electrical detection. Typically, one such general type of passive electrical circuit comprises some form of a tuned inductive-capacitive circuit such that when stimulated by an external electromagnetic field the resonant frequency of the tuned circuit can be detected. Various schemes for so stimulating and detecting LC resonant tags are, for example, set forth in U.S. Pat. Nos. 2,693,525 (Kendall), 2,910,579 (Jones & Currie), 3,299,424 (Vinding), 3,406,391 (LeVon), 3,624,631 (Chomet), 3,713,102 (Martin) and 3,740,742 (Thompson).

In such prior art identification and/or detection systems, the manner of attachment of the tag to the object to be identified and/or detected has been somewhat incidental. All such systems have, however, required that the object be directly handled in order to affix the tag to the object such as by mechanical fasteners, adhesives, insertion of the tag into the object and the like.

SUMMARY OF THE INVENTION

The present invention comprises a passive device capable of providing an electromagnetic response to an external electromagnetic field to enable the remote detection of the device comprising a inductor-capacitor tuned circuit resonant at a predetermined frequency, the inductor including a coil having between 300–700 turns surrounding a high permeability core and having an outer diameter not greater than 5.0 mm and a length not greater than 7.5 mm.

Where identification and/or detection enabling tags including passive electromagnetically responsive devices have been used in the past, such tags have been attached to the objects to be detected or identified by some mechanical means requiring direct handling of or direct contact with the object. Accordingly, the size of the passive device was not particularly significant. In certain conditions, however, such direct handling is not desired. For example, bulk handling of livestock demands that the animals be processed as rapidly as possible, hence there is a need to enable the remote tagging and subsequent detection and identification thereof. The present invention enables such remote detection and identification by providing a remotely detectable device having a size such that it may be included in a non-lethal projectile, propelled into an object such as a cow, etc., and yet be remotely detected. Such a projectile is the invention of Fred R. Paul, and is the subject of a co-pending patent application Ser. No. 504,060 filed the same day herewith.

The objects to which the devices are secured are detected within an interrogation zone by producing an electromagnetic field therein and by sensing for an electromagnetic response characteristic of the presence of the device. The device preferably has a Q-factor of not less than 30, and is preferably sensed by subjecting it to a pulsed electromagnetic field whereby the rapid change of field produces in the device a damped oscillation at the predetermined frequency, which oscillation is sensed in a remotely located receiver. The term "electromagnetic field" as used in this specification should be understood to comprise both a field produced by radiation from an antenna system and an inductive field from a coil system.

DESCRIPTION OF THE PREFERRED EMBODIMENTS

As outlined in the background of the invention, hereinabove, there are many known varieties of remotely detectable electromagnetically responsive devices, however, it has not been known prior to the invention thereof by Fred R. Paul, which invention is set forth in a companion application filed on the same day herewith, that such a remotely detectable device could be included in a projectile. Thus, the projectile of that invention preferably includes the passive electromagnetically responsive device of the present invention.

Figure 1:
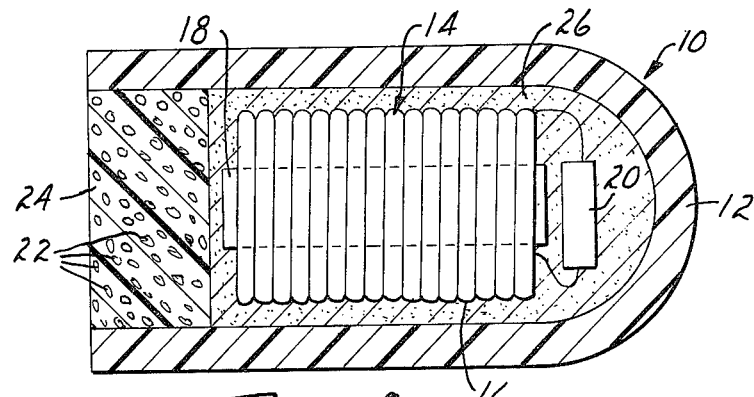
FIG. 1 is a sectional view of a projectile containing the device of the present invention.

The projectile 10 shown in FIG. 1 comprises a body portion 12 and the electromagnetically responsive device 14 of the present invention contained therein. The device 14 preferably comprises a high Q tuned inductive-capacitive circuit including a coil 16 surrounding a high permeability core 18, and a capacitor 20 connected in parallel with the coil 16. The electrical characteristics of such an inductive-capacitive tuned circuit are somewhat conventional, however, additional physical restraints are imposed hence facilitating the construction of a miniature device which can be readily carried in a small caliber projectile and yet be detectable at appreciable distances, i.e., at distances greater than several feet from the device when stimulated by readily produced fields and detected by fairly unsophisticated receivers. A preferred projectile disclosed in the above referenced application is designed to have an external diameter not greater than 0.3 inches (7.5 mm) (i.e., 0.25 caliber) and a length not greater than 0.5 inches (1.8 mm). In order to fit within a cavity within such a projectile, the coil included in the device of the present invention is miniaturized to desirably have an outer diameter of not greater than 0.2 inches (5 mm) and a length of not greater than 0.3 inches (7.5 mm). The device must also be constructed to withstand physical shock occurring upon impact of such a projectile. The coil 16 may alternatively be wound directly on the core 18 or wound on a removable bobbin and the core thereafter inserted. Particularly desirable high permeability materials for use as the cores has been found to be high permeability ferrites, poly-irons and mu-metals. A particularly desirable ferrite is a barium ferrite composition such as types 26 and 27 A obtained from the Stackpole Carbon Company, Inc., St. Mary's, Pa.

In order to complete the inductive-capacitive device 14, a capacitor 20 is connected in parallel with the coil 16. Such a capacitor 20 is similarly desirably miniaturized to result in a compact device 14 readily contained within the projectile 10. A particularly desired capacitor has been found to be a ceramic chip element, the leads of which may be directly bonded to the coil 16.

It has been found that a particularly desired frequency range within which the stimulated oscillations of the device 14 are most readily detectable after being inserted in a projectile and implanted in an animal is between 150–400 kHz, particularly at about 330 kHz. Accordindly, the coil 16 is constructed to have between 300–700 turns, such that when a capacitor having a capacitance value between 50–500 pf is added, the desired resonant frequency is achieved. One preferred construction has been found to include a coil having 575 turns of #38 American Wire Gage (AWG) enameled copper wire on a 0.075 inch (1.9 mm) diameter by 0.25 inch (6,4 mm) long ferrite core, rsulting in an inductance of about 2.2 mHy, and a capacitor of approximately 80 pf. The Q of the resultant circuit was about 50. As described in more detail hereinbelow, it has also been found preferable to detect the device 14 by sensing for such oscillations at the resonant frequency of the device 14 as persist after a pulsed electromagnetic field is terminated. To ensure sufficient persistence of such oscillations, it is desirable that the device 14 has a resonance Q-factor of not less than 30 and preferably as high as is practical. Typically, Q-value of about 50 have been found to be readily achieved with constructions of the type described.

For certain uses it is desired that the projectile 10 in which the device 14 of the present invention is preferably enclosed be shaped to define a cavity therewithin which is adapted for additionally containing materials which may subsequently be released from the cavity. In FIG. 1 such a cavity is shown filled with a material 22 and an inert binder 24, which material may, for example, be biologically active, or may be a releasable dye-like material to facilitate medical treatment and/or marking as well as electrically tagging the desired object.

Figure 2:
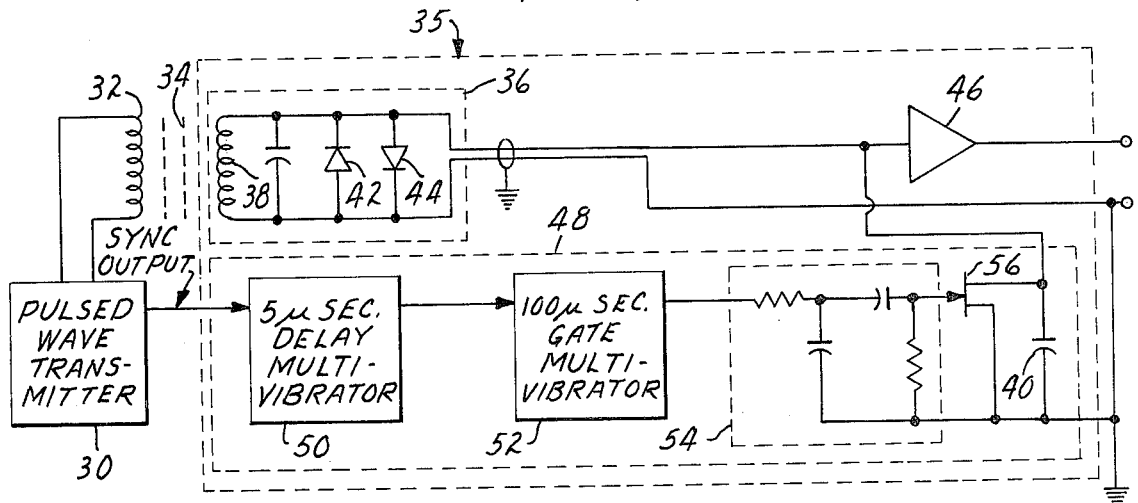
FIG. 2 is a schematic view of an embodiment for remotely detecting the device shown in FIG. 1.
Figure 3A:
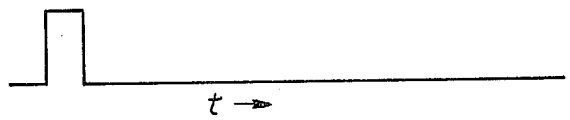
FIGS. 3A through 3E are a series of wave forms showing representative signals resulting upon the detection of a device in the systems shown in FIG. 2.
Figure 3B:

A preferred system for detecting a high Q tuned resonant device such as just described is shown in FIG. 2. A pulsed wave transmitter 30, just as the Model 350 pulse generator manufactured by Velonic, Inc., Santa Clara, California, and capable of delivering a peak power of 30 kw for a short duration of time, is used to drive a transmitting coil 32, which may desirably consist of a 30 inch (762 mm) diameter loop of three (3) turns of #12 AWG wire. A train of 700 V pulses, 1 μsec long, spaced 10 msec apart, such as is shown in FIG. 3A is thus produced. The inductive lag produced by the coil 32 results in a pulsed current such as is shown in FIG. 3B, having peak currents of about 45 amps. As is shown in FIG. 3B, the field completely collapses in less than 1 μsec after termination of the voltage pulse. The current pulse results in a pulsed electromagnetic field within the interrogation zone 34 having a wide energy spectrum such that energy at the same frequency as the resonant frequency of the device 14 is absorbed. The voltage pulse width is preferably less than one-half the period associated with the highest resonant fequency to be detected.

Figure 3C:
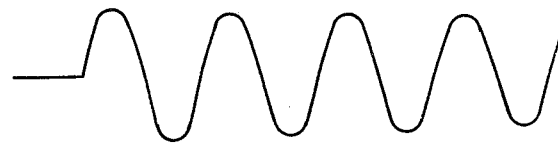

When the LC tuned resonant device having a Q value of about 50 and a resonant frequency of about 330 kHz was present in the zone 34, it was stimulated into oscillations at the resonant frequency. The resultant oscillations are depicted in FIG. 3C, and could be detected up to 80 μsec following each interrogation pulse.

Figure 3D:
Figure 3E:
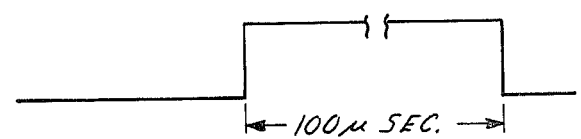

FIG. 2 further shows a preferred receiver 35 for detecting such oscillations subsequent to the termination of each transmitted pulse, which receiver 35 comprises an antenna section 36 tuned to the resonant frequency of the device 14, a similarly tuned narrow band amplifier 46, and gating circuitry 48 synchronized to the transmitter 30 to enable operation of the receiver only when the transmitter is off. The antenna section 36 comprises a coil 38 which in one embodiment contained 20 turns of wire, 15 inches (381 mm) in diameter. The capacitor 40 in parallel with the coil 38 is provided to tune the antenna section 36 to the desired frequency. Diodes 42 and 44 are provided to limit peak excursions of the voltage induced during interrogations to prevent overloading. The antenna section 36 is coupled to the narrow band tuned amplifier 46. The gating circuitry 48 essentially shorts out the antenna section when the receiver is not used by critically damping the receiver coil when appropriate. The circuitry 48 contains a 5 μsec delay monostable multivibrator 50 which is triggered by a synchronized pulse from the transmitter 30. Thus for each transmitted pulse shown as FIG. 3A, a synchronized pulse is also produced to switch the delay multivibrator 50 into a second state for 5 μsec, as shown in FIG. 3D, thereby allowing energy induced into the antenna during the transmitting pulse period to dissipate. The output of the delay multivibrator 50 is coupled to a 100 μsec monostable gate multivibrator 52 to switch the gate multivibrator 52 into a second state for a duration extending for a period of 100 μsec after the end of the initial 5 μsec delay such as is shown in FIG. 3E. The output of the gate multivibrator 52 is coupled through a RC integrator circuit 54 to a solid state switch 56, such as a U291 field effect transistor manufactured by Siliconix, Inc., Santa Clara, California, connected across the input of the amplifier 46 to turn off the transistor 56 and hence remove the short only during the 100 μsec period. The integrator circuit 54 reduces switching spikes which could cause ringing in the antenna section 35 and amplifier 46. If desired, additional circuits may be provided to decrease the rate at which the receiver is turned on, thereby preventing energy present in a fast leading edge from exciting the input of the receiver. The output of the receiver is adapted to be coupled to any variety of indicators, lights, bells, etc. to indicate the presence of the tuned device 14 in the zone 34.

Figure 4:
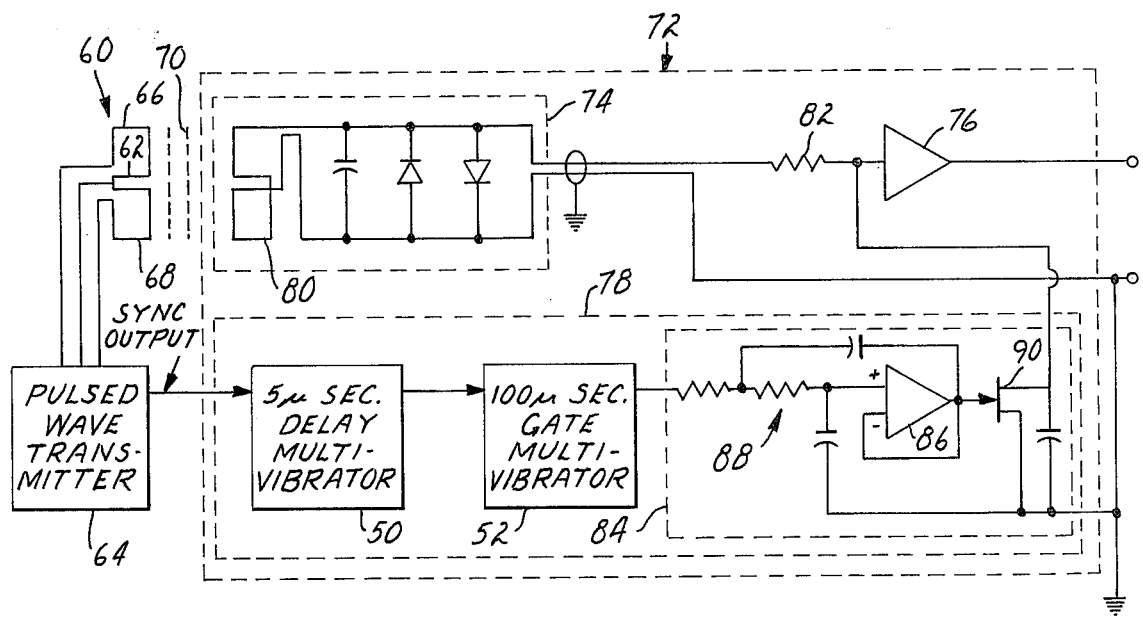
FIG. 4 is a schematic view of another embodiment for remotely detecting the device shown in FIG. 1.

In another preferred embodiment shown in FIG. 4, the transmitting coil comprises a modified "figure 8" loop 60 wherein the center legs 62 of the "figure 8" loop 60 were connected together to a ground terminal of a transmitter 64 and the outer portions of the "figure 8" loop 66 and 68 were connected in parallel to the output from the transmitter 64. The loop 60 is desirably formed of a single turn of #12 AWG wire, having dimensions of 4 feet by 2 feet (120 cm by 60 cm), and is desirably vertically positioned to define an interrogation zone 70 to be approximately 4 feet long and 2 feet high.

The transmitter 64 is similar to the transmitter 30 shown in FIG. 2 in that both produce high current pulses which, when coupled to a loop such as 32 or 60, results in a pulsed electromagnetic field. Preferably, the transmitter 64 utilizes a solid state controlled capacitive discharge system to generate the current pulses. In such a system, the current pulse width is inversely proportional to the square root of the product of the inductance of the loop 60 and the capacitance of the capacitor used to store charge until it is discharged into the loop. The desired pulse width is approximately equal to $1/2f$, where $f$ is the resonant frequency of the tuned device 14. Where the device 14 is shielded by a predominately water containing body, such as when implanted in an animal, optimum results were obtained when the inductance and capacitor values were selected to provide a pulse width of approximately two microseconds, which width was somewhat longer than that specified by the relationship $1/2f$.

Solid state capacitance discharge systems are well known in the art, hence need no further description herein, however, certain designs are preferred. Since the peak current is determined by the supply voltage, the inductance of the loop and the capacitance of the charge storage capacitor according to well known relationships and since a maximum of 600 volts can be readily handled by solid state switches capable of switching to provide microsecond pulse widths, it is desirable to reduce the inductance of the loop 60 and to increase the capacitance of the charge storage capacitor in order to maximize the peak current. Such a reduction in the inductance of the "figure 8" loop 60 is conveniently effected by independently driving both halves of the loop. The transmitter 64 is accordingly provided to independently drive each half of the loop 60. Solid state switches such as SCR's and the like, and trigger sources therefor are well known in the art. Such solid state capacitance discharge techniques provide considerable advantages in economy, weight, and power output.

The receiver 72 of this embodiment is functionally the same as that previously shown in FIG. 2, and includes a similar antenna section 74 tuned to the resonant frequency of the resonant device, a similarly tuned narrow band amplifier 76 and gating circuitry 78 synchronized to the transmitter 64 to enable operation of the receiver 72 only when the transmitter is off. The antenna section 74 in this embodiment comprises a coil 80 similarly constructed in a "figure 8" shape and having the same general dimensions as that of the transmitting coil 60 but comprising 8 turns of #24 AWG wire. The coil 80 is desirably vertically positioned opposite the transmitting loop 60 and separated therefrom by approximately 4 feet (120 cm) to further define the interrogation zone 70 therebetween. The remaining components in the antenna section 74 were similar to those contained in the antenna section 36 shown in FIG. 2. The antenna section 74 is coupled to the narrow band amplifier 76 through a damping resistor 82, the value of which is selected in conjunction with the value of the inductance of the coil 80 and other circuit capacitances to critically damp the coil 80 such that oscillations stimulated in the coil 80 are rapidly attenated except when the tuned amplifier 76 is not used. The RC integrator 54 of the gating circuitry 48 shown in FIG. 2 is, in this embodiment, replaced with a two pole 10 kHz low pass active filter 84 to prevent harmonics as may be present in the switching wave form from being coupled into the input of the amplifier 76, thereby undesirably activating it. Such a filter desirably comprises an operational amplifier 86 such as one section of a National Semi-conductor Inc. quad operational amplifier Model #LM324, having a capacitor-resistor network 88 providing positive feedback between the output and the input of the operational amplifier 86 to provide a flat response over the desired frequency range. The output of the operational amplifier 86 is coupled to a field effect transistor 90, the output of which is coupled across the tuned amplifier 76 to control the activation of the amplifier 76 in the same manner as described hereinabove in conjunction with the embodiment shown in FIG. 2.

When a transmitter and receiver such as shown in FIG. 4 was positioned to define an interrogation zone approximately 4 feet (120 cm) wide, it was found that a device 14 such as described hereinabove could be readily detected within the zone 70 so long as the major axis of the device was at an angle not greater than 60° from a horizontal plane. The currents flowing in the "figure 8" transmitting loop 60 result in an electromagnetic field having two substantially different directions in different portions of the loop, there being one field direction associated with currents flowing in the center of the loop, and othogonally positioned but mutually opposite fields associated with the two halves of the loop. The response to the presence of the device 14 within the interrogation zone 70, is, therefore, dependent upon the relative position of the device with respect to the various portions of the transmitting loop 66. Since the device is substantially sensitive to only one direction, the greatest sensitivity to the device within the interrogation zone 70 is when the major axis of the device is parallel to the field produced by the transmitting loop 66 in each area of the interrogation zone 70.

The "figure 8" receiving loop 80 is similarly preferred in that it enhances the multi-dimensional sensitivity such that when the device 14 is within various portions of the interrogation zone 70, similarly disposed portions of the receiving loop 80 will have a maximum sensitivity to the device 14. The use of the "figure 8" receiving loop 80 is further desirable in that the two sections of the loop cancel extraneous electromagnetic radiations received from remote sources such as radio stations and the like.

For purposes of simplicity, the discussion hereinabove has been restricted to the generation and detection of electromagnetic waves with a single transmitting and detecting coil. Inasmuch as the LC resonant device is essentially sensitive to such waves along only a single direction and since that direction cannot always be controlled, it is likewise desirable for many installations to provide an array of transmitting and receiving coils such as are disclosed in U.S. Pat. No. 3,697,966 (Elder and Wright) to facilitate detection of the projectile regardless of the orientation within the interrogation zone.

It is similarly within the scope of the present invention to position the transmitting and receiving coils about the interrogation zone in a variety of configurations such as are well known in the art. The transmitting and receiving coils, may, for example, be opposing each other on opposite sides of the zone or may both be located adjacent each other on the same side of the zone.

Having thus described the present invention, what I claim is:

1. An identification system for remotely tagging objects and for thereafter remotely detecting said objects comprising
   a passive resonant device capable of providing an electromagnetic response to an external electromagnetic field, said device including an inductor-capacitor tuned circuit resonant at a predetermined frequency, means for securing said device to an object to be tagged, means for producing a wide energy spectrum electromagnetic field within an interrogation zone through which said tagged object may pass, comprising a "figure 8" transmitting coil for providing a substantially two dimensional electromagnetic field, a field in one direction being associated with current flowing in two center legs of said "figure 8" coil and a field in another direction being associated with current flowing in two halves of the "figure 8", said field having a duration approximately equal to $1/f$ where $f$ is said predetermined frequency such that a portion of the energy presented by said electromagnetic field is absorbed by a said passive device within said interrogation zone, whereby said field produces in said tuned circuit a damped oscillation at said predetermined frequency, and means including a "figure 8" receiving coil having dimensions which are approximately the same as that of the transmitting coil, positioned parallel thereto and spaced therefrom, to define a said interrogation zone therebetween for sensing said damped oscillations extending for a duration equal to at least 20 cycles thereof whereby the presence of the said tagged object in the zone is capable of being detected throughout the zone.

2. An identification system for remotely tagging objects and for thereafter remotely detecting said objects comprising a passive resonate device capable of providing an electromagnetic response to an external electromagnetic field, said device including an inductor-capacitor tuned circuit resonant at a predetermined frequency, means for securing said device to an object to be tagged, means for producing a wide energy spectrum electromagnetic field within an interrogation zone through which said tagged object may pass, said field having a duration approximately equal to $1/f$ where $f$ is said predetermined frequency such that a portion of the energy presented by said electromagnetic field is absorbed by a said passive device within said interrogation zone, whereby said field produces in said tuned circuit a damped oscillation at said predetermined frequency, and means for sensing said damped oscillations extending for a duration equal to at least 20 cycles thereof whereby the presence of the said tagged object in the zone is detected, said means for sensing said damped oscillation comprising an antenna coil tuned to said resonant frequency, an amplifier tuned to said resonant frequency, having an input coupled to said antenna coil and having an output at which an electrical signal may be produced in response to the presence of a predetermined number of cycles of said resonant frequency, and control means coupled to said electromagnetic field producing means for interrupting the coupling between the antenna coil and the amplifier except for a period following the termination of said field and extending for a duration equal to at least 20 cycles of said damped oscillation, said control means comprising a 10 kHz low pass active filter for filtering out extraneous signals such as harmonics as may be coupled from the field producing means to improve the reliability of said interrupting and to prevent said harmonics from being coupled into said amplifier.

3. An identification system for remotely tagging animals such as livestock including cattle and for thereafter remotely detecting said animals, said system being adapted for use with projectiles to be nonlethally propelled toward and implanted in said animals such that said animals may be remotely detected, said system comprising a passive resonant device adapted for inclusion in the projectile and capable of providing an electromagnetic response to an external electromagnetic field, said device having a Q-factor of not less than 30 and including an inductor-capacitor tuned circuit resonant at a predetermined frequency, said inductor including a coil having between 300–700 turns surrounding a high permeability core and having an outer diameter not greater than 5.0 mm and a length of not greater than 7.5 mm, means for securing said device in a projectile to be implanted in an animal to be detected, means for producing a rapidly changing pulsed electromagnetic field within an interrogation zone through which a said animal may pass, said pulsed electromagnetic field producing means comprising a "figure 8" transmitting coil for providing a substantially two dimensional electromagnetic field, a field in one direction being associated with current flowing in two center legs of said "figure 8" coil and a field in another direction being associated with current flowing in two halves of the "figure 8," and means for sensing a said electromagnetic response, said sensing means comprising a "figure 8" receiving coil having dimensions which are approximately the same as that of the transmitting coil, positioned parallel thereto and spaced therefrom to define a said interrogation zone therebetween, whereby the rapid change of field produces in said tuned circuit a damped oscillation at said predetermined frequency such that the presence of a said device and hence of a said animal is detected with improved capability throughout the zone.

4. An identification system for remotely tagging animals such as livestock including cattle and for thereafter remotely detecting said animals, said system being adapted for use with projectiles to be nonlethally propelled toward and implanted in said animals such that said animals may be remotely detected, said system comprising a passing resonant device adapted for inclusion in the projectile and capable of providing an electromagnetic response to an external electromagnetic field, said device having a Q-factor of not less than 30 and including an inductor-capacitor tuned circuit resonant at a predetermined frequency, said inductor including a coil having between 300–700 turns surrounding a high permeablity core and having an outer diameter not greater than 5.0 mm and a length of not greater than 7.5 mm, means for securing said device in a projectile to be implanted in an animal to be detected, means for producing a rapidly changing pulsed electromagnetic field within an interrogation zone through which a said animal may pass, and means for sensing a said electromagnetic response, said sensing means comprising an antenna coil tuned to said resonant frequency, an amplifier tuned to said resonant frequency, having an input coupled to said antenna coil and having an output at which an electrical signal may be produced in response to the presence of a predetermined number of cycles of said resonant frequency, and control means coupled to said electromagnetic field producing means for interrupting the coupling between the antenna coil and the amplifier except for a period following the termination of said field and extending for a duration equal to at least 20 cycles of said damped oscillation, and control means including a 10 kHz low pass active filter for filtering out extraneous signals such as harmonics as may be coupled from the field producing means to improve the reliability of said interrupting and to prevent said harmonics from being coupled into said amplifier, whereby the rapid change of field produces in said tuned circuit a damped oscillation at said predetermined frequency such that the presence of a said device and hence of a said animal in the zone is detected.

* * * * *